United States Patent
Matsushima et al.

(10) Patent No.: US 6,798,474 B2
(45) Date of Patent: Sep. 28, 2004

(54) LCD WITH LIGHT SHIELDING ON SAME INSULATOR AS PIXEL AND EXTENDING BEYOND SEALANT INNER SURFACE

(75) Inventors: Yasuhiro Matsushima, Kashihara (JP); Takashi Sato, Tenri (JP)

(73) Assignee: Sharp Kabushiki Kaisha, Osaka (JP)

( * ) Notice: Subject to any disclaimer, the term of this patent is extended or adjusted under 35 U.S.C. 154(b) by 59 days.

(21) Appl. No.: 09/045,385

(22) Filed: Mar. 20, 1998

(65) Prior Publication Data

US 2003/0076458 A1 Apr. 24, 2003

(30) Foreign Application Priority Data

Mar. 25, 1997 (JP) ............................................. 9-071029

(51) Int. Cl.[7] .......................................... G02F 1/1335
(52) U.S. Cl. ..................................... 349/110; 349/106
(58) Field of Search ................................ 349/110, 106, 349/58

(56) References Cited

U.S. PATENT DOCUMENTS

| | | | | |
|---|---|---|---|---|
| 4,538,884 A | * | 9/1985 | Masaki ........................ 349/28 |
| 5,285,301 A | * | 2/1994 | Shirahashi et al. .......... 349/143 |
| 5,585,951 A | * | 12/1996 | Noda et al. .................. 349/122 |
| 5,617,230 A | * | 4/1997 | Ohgawara et al. .......... 349/110 |
| 5,708,486 A | * | 1/1998 | Miyawaki et al. ............ 349/44 |
| 5,757,054 A | * | 5/1998 | Miyawaki et al. .......... 257/390 |
| 5,757,452 A | * | 5/1998 | Masaki et al. ............... 349/110 |
| 5,760,861 A | * | 6/1998 | Kim ............................. 349/110 |
| 5,818,550 A | * | 10/1998 | Kadota et al. ............... 349/106 |
| 5,822,028 A | * | 10/1998 | Miyawaki .................... 349/111 |
| 5,831,701 A | * | 11/1998 | Matsuyama et al. ........ 349/110 |
| 5,844,645 A | * | 12/1998 | Kashimoto ................... 349/106 |
| 5,877,830 A | * | 3/1999 | Shimada et al. ............. 349/113 |
| 5,933,208 A | * | 8/1999 | Kim ............................. 349/106 |
| 5,995,189 A | * | 11/1999 | Zhang ......................... 345/206 |
| 6,038,006 A | * | 3/2000 | Sasaki et al. ................ 349/106 |
| 6,057,900 A | * | 5/2000 | Ono et al. ................... 349/110 |
| 6,081,305 A | * | 6/2000 | Sato et al. ...................... 349/5 |
| 6,115,094 A | * | 9/2000 | Fukunaga .................... 349/138 |
| 6,162,654 A | * | 12/2000 | Kawabe ....................... 349/106 |
| 6,388,723 B1 | * | 5/2002 | Iida et al. .................... 349/111 |
| 6,587,169 B1 | * | 7/2003 | Yamazaki et al. ........... 349/110 |

FOREIGN PATENT DOCUMENTS

| | | |
|---|---|---|
| JP | 6-175157 | 6/1994 |
| JP | 6-281925 | 10/1994 |
| JP | 07152022 A * | 6/1995 |

* cited by examiner

*Primary Examiner*—Kenneth Parker
(74) *Attorney, Agent, or Firm*—David G. Conlin; David A. Tucker; Edwards & Angell, LLP (57) ABSTRACT

A liquid crystal display device is provided which includes: a first substrate; a second substrate; and a liquid crystal layer interposed between the first substrate and the second substrate. The first substrate includes a plurality of switching elements, a plurality of picture element electrodes connected to the plurality of the switching elements and a plurality of color filters which are arranged so as to correspond to the plurality of the picture element electrodes on an area of the first substrate corresponding to a display region of the liquid crystal display device, and a light shielding frame layer around a periphery of the display region.

7 Claims, 6 Drawing Sheets

LCD WITH LIGHT SHIELDING ON SAME INSULATOR AS PIXEL AND EXTENDING BEYOND SEALANT INNER SURFACE

BACKGROUND OF THE INVENTION

1. Field of the Invention

The present invention relates to a liquid crystal display device which may be incorporated in audio visual (AV) apparatuses, office automation (OA) apparatuses, or the like. The present invention also relates to a method for producing the liquid crystal display device.

2. Description of the Related Art

An active matrix liquid crystal display device includes a TFT substrate which includes picture element electrodes, and thin film transistors (hereinafter, simply referred to as "TFTs") connected to the picture element electrodes formed on a glass substrate in a matrix. The active matrix liquid crystal display device further includes a counter substrate on which counter electrodes are formed. The TFT substrate and the counter substrate are adhered to each other with a sealing material, with a liquid crystal material interposed therebetween.

Figure 6:
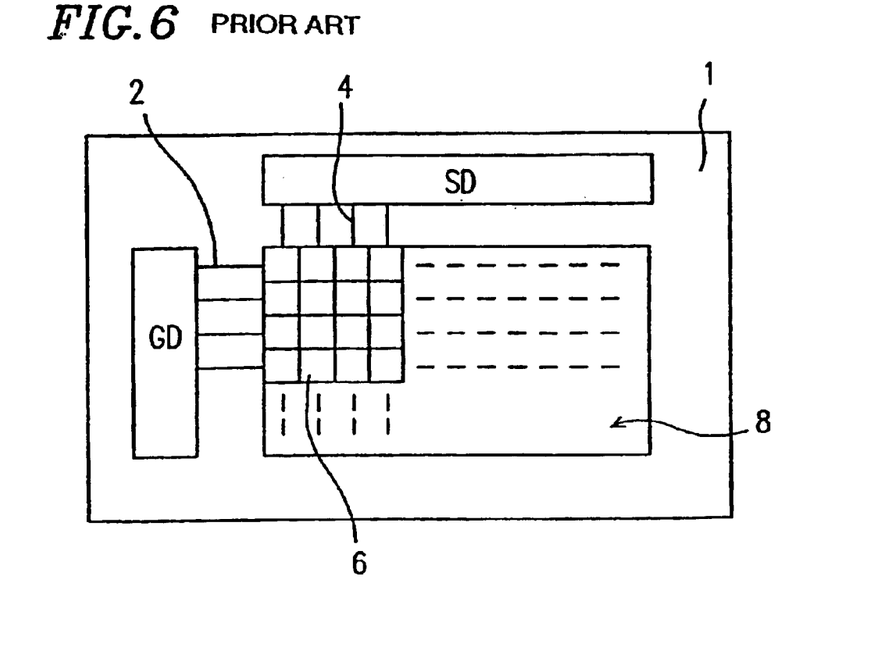
FIG. 6 is a plan view of a TFT substrate of a conventional liquid crystal display device.
Figure 7:
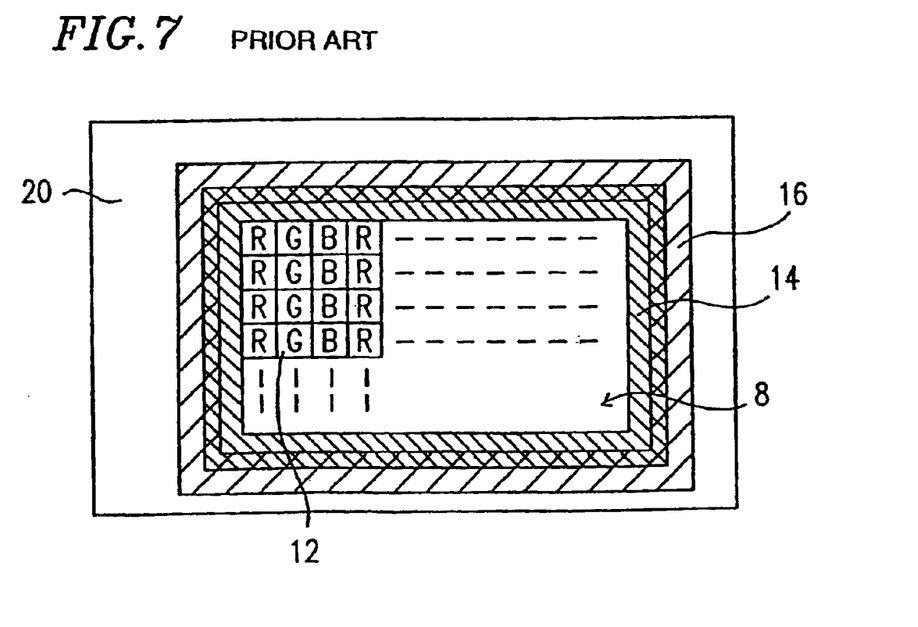
FIG. 7 is a plan view of a counter substrate of a conventional liquid crystal display device.

FIG. 6 is a simplified plan view of the TFT substrate of a conventional liquid crystal display device. FIG. 7 is a plan view of the counter substrate of the conventional liquid crystal display device.

Referring to FIG. 6, the TFT substrate includes a glass substrate 1 and picture element electrodes 6 arranged on the glass substrate 1 in a matrix so as to correspond to an image display region 8.

Herein, "an image display region" refers to an area of a substrate corresponding to a display region of a liquid crystal display device from where a viewer can actually see a displayed image.

Each of the picture element electrodes 6 is connected to corresponding one of a plurality of gate bus lines 2 and corresponding one of a plurality of source bus lines 4. The TFT substrate further includes a gate driver GD for supplying scanning signals to the gate bus lines 2 and a source driver SD for supplying data signals to the source bus lines 4.

Referring to FIG. 7, the counter substrate includes a glass substrate 20, and color filters 12 provided on the image display region 8 of the glass substrate 20 so as to correspond to the picture element electrodes 6 on the TFT substrate. Counter electrodes (not shown) made of a transparent conductive film are formed on the color filters 12. The liquid crystal material interposed between the TFT substrate and the counter substrate is switched in accordance with a potential difference between the picture element electrodes and the corresponding counter electrodes. Light shielding layers (not shown) which act as so-called black matrix, are formed on the counter substrate for shielding light incident to the TFTs and light leaking from gaps between each picture element electrode.

Generally, a light shielding frame section 14 is provided on the counter substrate around a periphery of the image display region 8 for shielding unnecessary light incident to the periphery of the image display region 8. Since the liquid crystal display device uses back light, in the case where the light shielding frame section 14 is not provided, the unnecessary light reaches to the TFTS, thereby deteriorating the OFF characteristics of the TFTs, and thus deteriorating the display quality of the liquid crystal display device as well.

The TFT substrate and the counter substrate are adhered to each other with a sealing resin 16 which is provided in the vicinity of the light shielding frame section 14. A UV curable sealing resin is often used as the sealing resin 16. In this case, UV light is radiated from the counter substrate side toward the TFT substrate side, or the TFTs are damaged and the characteristics thereof are deteriorated by the UV light in the step of adhering the substrates. Furthermore, in the case of using the UV curable sealing resin, the size of the light shielding frame section 14 is limited in order that the sealing resin 16 can be irradiated with UV light. However, smaller size of the light shielding frame section 14 necessitates higher alignment accuracy in assembling the light shielding frame section 14 with the module, which renders this step of adhering the substrates complicated.

In order to overcome the above-described problem, a technique is proposed, for example, in Japanese Laid-Open Publication No. 6-175157, in which a light shielding frame section is formed on a TFT substrate.

However, according to the above-described technique, although the light shielding frame section is formed on the TFT substrate, color filters for displaying colors or light shielding layers (black matrix) need to be formed on a counter substrate. In this case, a sealing margin of the TFT substrate and the counter substrate is as small as about 3 $\mu$m, which necessitates use of a large scale sealing apparatus.

SUMMARY OF THE INVENTION

According to one aspect of the present invention, a liquid crystal display device is provided which includes: a first substrate; a second substrate; and a liquid crystal layer interposed between the first substrate and the second substrate. The first substrate includes a plurality of switching elements, a plurality of picture element electrodes connected to the plurality of the switching elements and a plurality of color filters which are arranged so as to correspond to the plurality of the picture element electrodes on an area of the first substrate corresponding to a display region of the liquid crystal display device, and a light shielding frame layer around a periphery of the display region. Accordingly, there is no need for forming color filters and a light shielding frame layer on a second substrate.

In one embodiment of the present invention, the first substrate further including light shielding layers on the switching elements, for shielding light incident to the switching elements. Accordingly, there is no need for providing a light shielding layer on the second substrate.

In one embodiment of the present invention, the light shielding layers and the light shielding frame layer are made of a same material. Accordingly, the light shielding layers and the light shielding frame layer are formed in one step.

In one embodiment of the present invention, the light shielding layers and the light shielding frame layer are formed through an electrochemical reaction. Accordingly, the light shielding layers and the light shielding frame layer are easily formed.

In one embodiment of the present invention, the light shielding frame layer includes a plurality of colored layers of different colors. According to one embodiment of the present invention, the plurality of colored layers of different colors are made from material used to form the plurality of color filters. Accordingly, the light shielding frame layer is formed of colored layers made of the same materials as the color filters, and thus the light shielding frame layer and the color filters are simultaneously formed.

In one embodiment of the present invention, the first substrate further includes a driving circuit for driving the switching elements, and the light shielding frame layer is formed over the driving circuit. Accordingly, light incident to the driving circuits is shielded by the light shielding frame layer.

According to another aspect of the present invention, a liquid crystal display device is provided which includes: a first substrate; a second substrate; and a liquid crystal layer interposed between the first substrate and the second substrate. The first substrate includes a plurality of switching elements, a plurality of picture element electrodes connected to the plurality of the switching elements and light shielding layers on the switching elements on an area of the first substrate corresponding to a display region of the liquid crystal device, and a light shielding frame layer around a periphery of the display region.

In one embodiment of the present invention, the light shielding layers and the light shielding frame layer are made of a same material.

According to still another aspect of the present invention, a method for producing a liquid crystal display device is provided, the liquid crystal display device including a first substrate, a second substrate, and a liquid crystal layer interposed between the first substrate and the second substrate. The method includes the steps of forming a plurality of switching elements, a plurality of picture element electrodes connected to the plurality of the switching elements and a plurality of color filters which are arranged so as to correspond to the plurality of the picture element electrodes on an area of the first substrate corresponding to a display region of the liquid crystal display device, and a light shielding frame layer on the first substrate around a periphery of the display region. Accordingly, there is no need for forming color filters and a light shielding frame layer on a second substrate.

In one embodiment of the present invention, the step of forming the color filters and the step of forming the light shielding frame layer are conducted as the same step. Accordingly, the color filters and the light shielding frame layer are formed in one step.

In one embodiment of the present invention, the method further includes a step of forming light shielding layers on the first substrate. Accordingly, there is no need for providing a light shielding layer on the second substrate.

In one embodiment of the present invention, the step of forming the light shielding layers and the step of forming the light shielding frame layer are conducted as the same step. Accordingly, the light shielding layers and the light shielding frame layer are formed in one step.

In one embodiment of the present invention, the step of forming the light shielding layer and the step of forming the light shielding frame layer employ an electrochemical reaction. Accordingly, the light shielding layers and the light shielding frame layer are easily formed.

In one embodiment of the present invention, the step of forming the light shielding frame layer includes a step of superimposing, at least partially, a plurality of colored layers of different colors.

According to still another aspect of the present invention, a method for producing a liquid crystal display device is provided, the liquid crystal display device including a first substrate, a second substrate and a liquid crystal layer interposed between the first substrate and the second substrate. The method includes the steps of forming a plurality of switching elements, a plurality of picture element electrodes connected to the plurality of the switching elements and light shielding layers on the switching elements on an area of the first substrate corresponding to a display region of the liquid crystal display device, and a light shielding frame layer on the first substrate around a periphery of the display region.

In one embodiment of the present invention, the step of forming light shielding layers and the step of forming the light shielding frame layer are conducted as the same step.

Thus, the invention described herein makes possible the advantages of providing: (1) a liquid crystal display device which includes a counter substrate that can be easily formed, and in which the counter substrate and a TFT substrate are easily adhered to each other; and (2) a method for producing the liquid crystal display device.

These and other advantages of the present invention will become apparent to those skilled in the art upon reading and understanding the following detailed description with reference to the accompanying figures.

DESCRIPTION OF THE PREFERRED EMBODIMENTS

Hereinafter, the present invention will be described by way of illustrative examples with reference to the accompanying drawings. The same reference numerals designate the same components.

EXAMPLE 1

Figure 1:
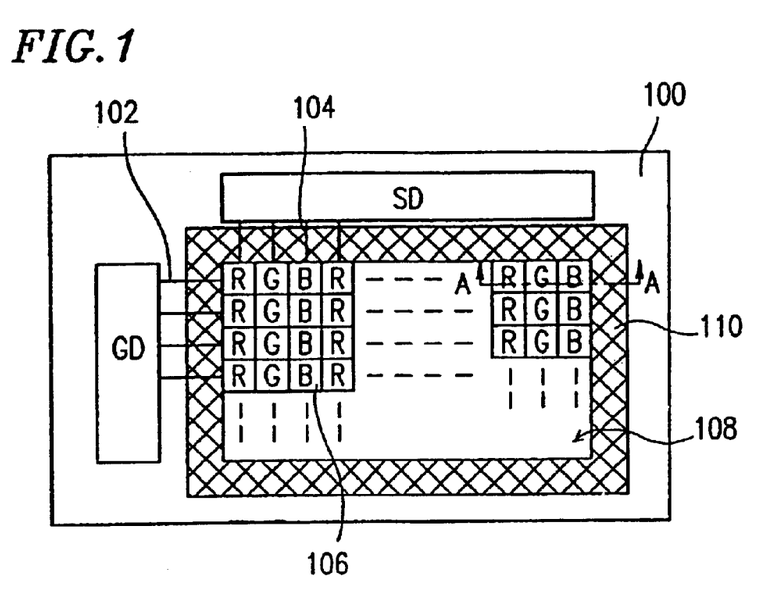
FIG. 1 is a plan view showing a TFT substrate of a liquid crystal display device according to first, second and third examples of the present invention.

FIG. 1 is a plan view showing a TFT substrate of a liquid crystal display device according to first, second and third examples of the present invention.

Referring to FIG. 1, a gate driver GD and a source driver SD are arranged on an insulative substrate 100 which is made of, for example, glass. The gate driver GD supplies scanning signals to picture elements 106 via gate bus lines 102. The source driver SD supplies data signals to the picture elements 106 via source bus lines 104. As shown in FIG. 1, a light shielding frame section 110 is formed on the TFT substrate around a periphery of an image display region 108.

Figure 2:
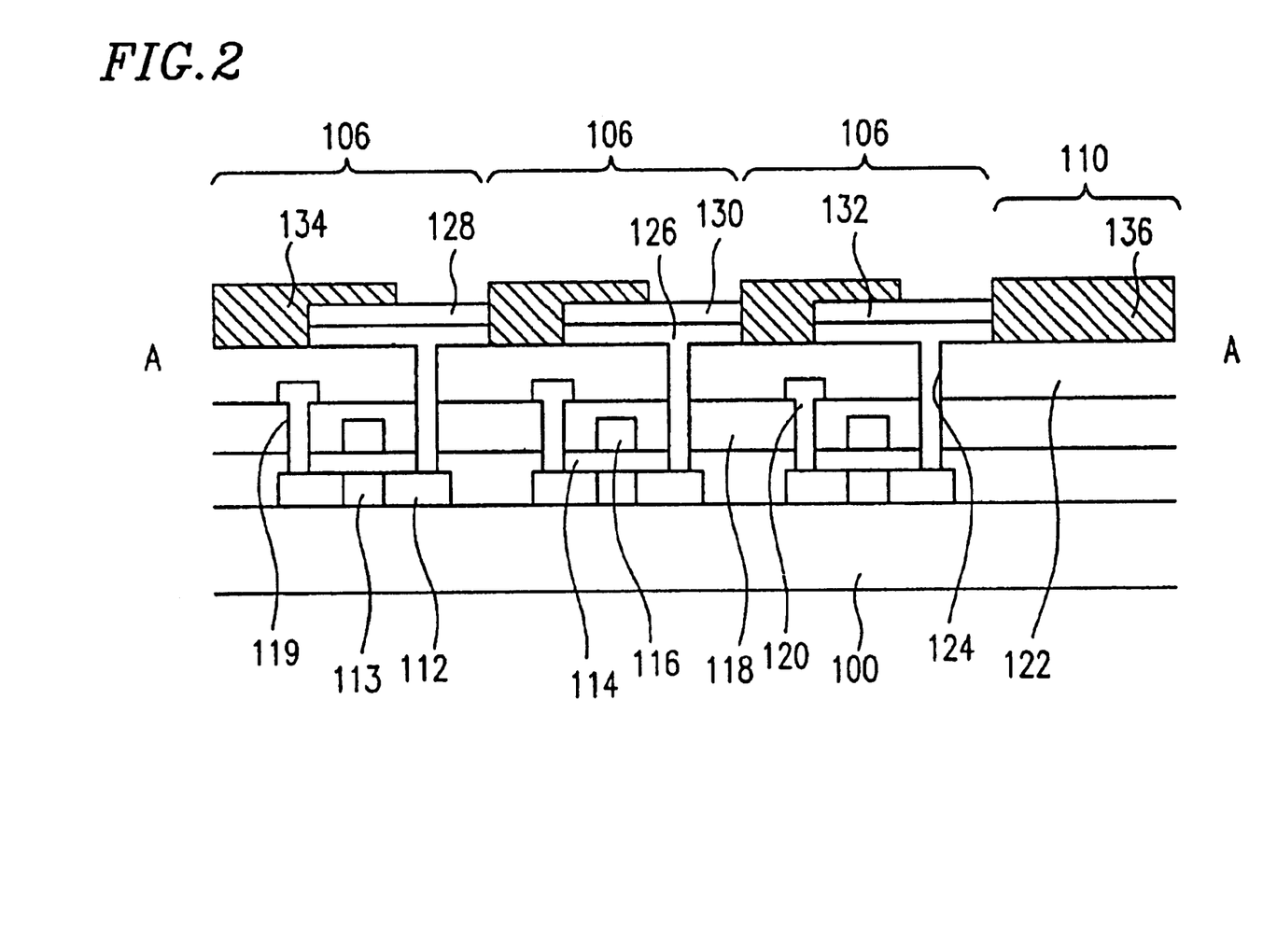
FIG. 2 is a cross-sectional view taken along line A—A of FIG. 1, showing three picture elements and a part of a light shielding frame section of the liquid crystal display device according to the first example of the present invention.

FIG. 2 is a cross-sectional view taken along line A—A of FIG. 1, showing three picture elements 106 and a part of the light shielding frame section 110 of the liquid crystal display device according to the first example of the present invention.

Hereinafter, a method for producing the liquid crystal display device according to the first example of the present invention will be described with reference to FIG. 2.

First, active layers 112 made of amorphous silicon (a-Si) or polycrystal silicon (p-Si) are formed to a thickness of about 40 nm on the insulative substrate 100. Then, a gate insulating film 114 made of $SiO_2$ is formed to a thickness of about 100 nm on each active layer 112. Then, a gate electrode 116 made of Al or p-Si is formed to a thickness of about 300 nm on each gate insulating film 114. Subsequently, phosphorous ions are introduced from above the gate electrodes 116 toward the substrate 100 while using the gate electrodes 116 as masks. As a result, an undoped channel region 113 is formed in each active layer 112 beneath each gate electrode 116. Regions of each active layer 112 other than the undoped channel region 113, i.e., regions doped with phosphorous ions, act as low resistance regions. Thereafter, a first interlayer insulating film 118 is formed. Then, after providing contact holes 119 as shown in FIG. 2, source bus lines 104 made of Al are formed. Thereafter, a second interlayer insulating film 122 is formed. Then, after providing contact holes 124 as shown in FIG. 2, picture element electrodes 126 made of a transparent conductive film are formed.

According to the first example of the present invention, RGB (Red, Green and Blue) color filters 128, 130 and 132 are formed by using the picture element electrodes 126. The RGB color filters 128, 130 and 132 are formed on the picture element electrodes 126 by a micell electrolytic method as follows. A micell electrolytic method is disclosed, for example, in Japanese Laid-Open Publication No. 6-281925.

First, 1 to 2 g red pigment (Lithol Scarlet K3700: produced by BASF) is added and dispersed in a 2 mM aqueous solution of a compound represented by Formula 1 (FPEG: ferrocenyl polyethylene glycol). Then, 0.1 M lithium bromide (supporting electrolyte) is added and dispersed for 30 minutes by an ultrasonic homogenizer. The resultant solution is further stirred for 3 days by a stirrer, thereby preparing a red pigment dispersed solution.

<Formula 1>

Similarly, 1 to 2 g green pigment (Meliogen Green L9361: produced by BASF) is added and dispersed in a 2 mM aqueous solution of a compound represented by Formula 1 (FPEG). Then, 0.1 M lithium bromide (supporting electrolyte) is added and dispersed for 30 minutes by an ultrasonic homogenizer. The resultant solution is further stirred for 3 days by a stirrer, thereby preparing a green pigment dispersed solution.

Similarly, 1 to 2 g blue pigment (Meliogen Blue B7080: produced by BASF) is added and dispersed in a 2 mM aqueous solution of a compound represented by Formula 1 (FPEG). Then, 0.1 M lithium bromide (supporting electrolyte) is added and dispersed for 30 minutes by an ultrasonic homogenizer. The resultant solution is further stirred for 3 days by a stirrer, thereby preparing a blue pigment dispersed solution.

Thus, red, blue and green pigment dispersed solutions are individually prepared.

Thereafter, the above-described substrate is immersed into the red pigment dispersed solution, and subjected to a micell electrolytic treatment while, by using terminal electrodes of the source bus lines 104, ON signals are selectively applied to the gate bus lines 102 which are connected to picture element electrodes corresponding to red picture elements. The micell electrolytic treatment is performed for 30 minutes under the conditions of a voltage of about 0.5 V and a temperature of about 25° C., while using a saturated calomel electrode (SCE) as a reference electrode and an aluminum plate as an anode. After the micell electrolytic treatment, the substrate is washed with pure water and baked at a temperature of 180° C. for 1 hour, thereby forming the red color filters 128 on the corresponding picture element electrodes 126. Once the color filters formed by the above-described micell electrolytic treatment are baked, the color filters loose their conductivity.

Similarly, the thus-obtained substrate is immersed into the green pigment dispersed solution so as to form green color filters 130 on the corresponding picture element electrodes 126 by electrically selecting signals lines corresponding to green picture elements. Since the previously formed red color filters 128 no longer have conductivity by being baked, the green color filters 130 are not formed on the red color filters 128. Similarly, the blue color filters 132 are formed on the picture element electrodes corresponding to blue picture elements.

An average thickness of the red color filters 128 is about 0.5 μm, that of the green color filters 130 is about 0.4 μm and that of the blue color filters 132 is about 0.6 μm.

Although the color filters 128, 130 and 132 are formed by a micell electrolytic method according to the first example of the present invention, the present invention is not limited thereto. The color filters 128, 130 and 132 may be formed by any electrochemical method such as, for example, an electrodeposition method.

Thus, according to the first example of the present invention, the RGB color filters 128, 130 and 132 are formed on the TFT substrate by using picture element electrodes 126.

Then, light shielding layers 134 are formed of a black resist for shielding light incident to the TFTs and light leaking from gaps between each picture element electrodes. According to the first example of the present invention, simultaneously with the light shielding layer 134, a black resist 136 is formed as part of the light shielding frame section 110. Accordingly, the light shielding layers 134 and the light shielding frame section 110 can be formed in one step by using the same material. Thus, an additional step for forming the light shielding frame section 110 is not required.

According to the first example of the present invention, the color filters, the light shielding layers and the light shielding frame section are formed on the TFT substrate. Therefore, a counter substrate can be easily produced by simply forming counter electrodes and an alignment film. Moreover, since the color filters are formed on the TFT substrate, the TFT substrate and the counter substrate can be adhered to each other without requiring high accuracy, and thus a large scale apparatus is not necessary, thereby simplifying the step of adhering the substrates.

EXAMPLE 2

Figure 3:
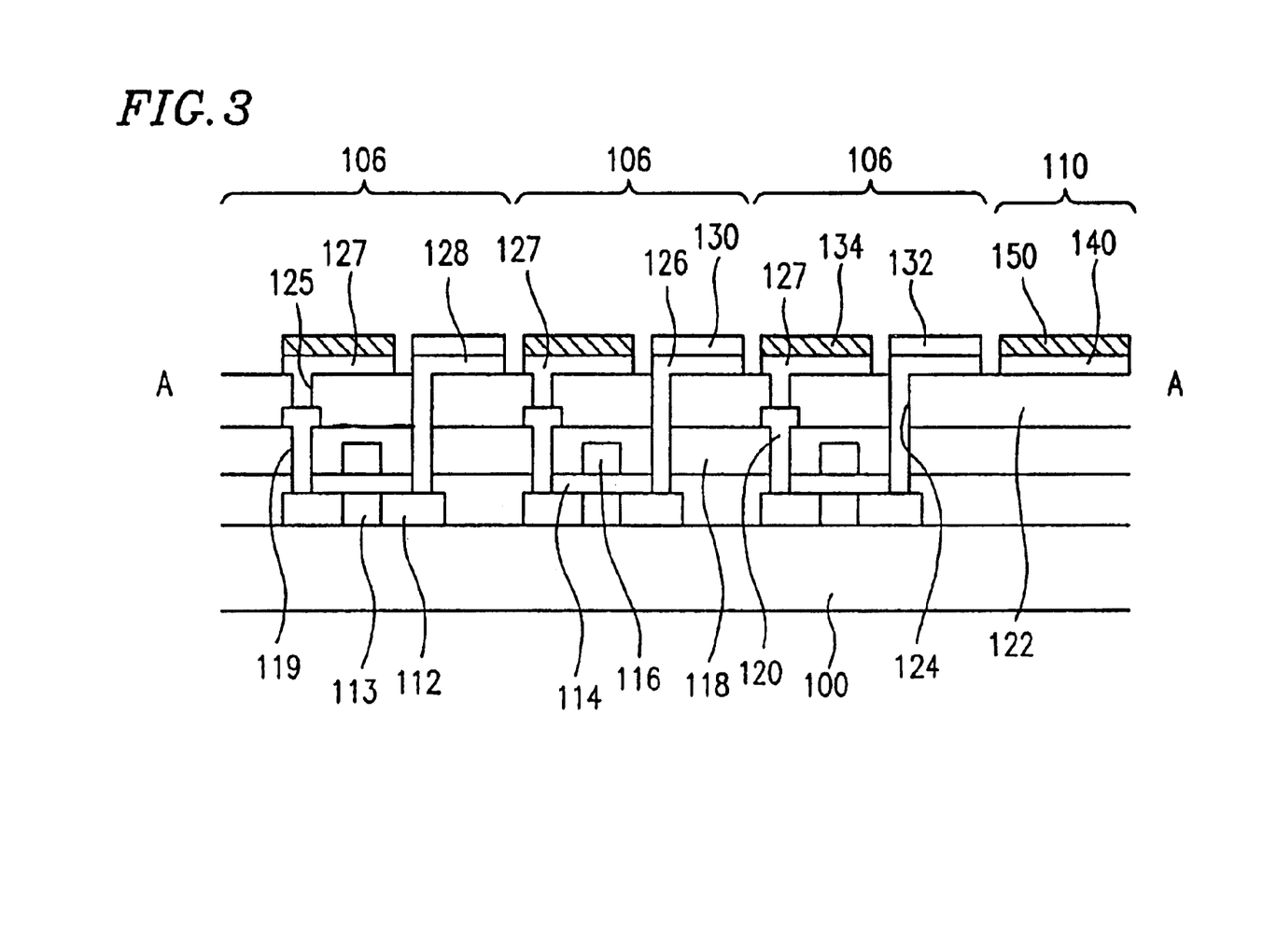
FIG. 3 is a cross-sectional view taken along line A—A of FIG. 1, showing three picture elements and a part of a light shielding frame section of the liquid crystal display device according to the second example of the present invention.

FIG. 3 is a cross-sectional view taken along line A—A of FIG. 1, showing three picture elements 106 and a part of the light shielding frame section 110 of a liquid crystal display device according to the second example of the present invention.

Hereinafter, a method for producing the liquid crystal display device according to the second example of the present invention will be described with reference to FIG. 3.

Active layers 112 with undoped channel regions 113, gate insulating films 114, gate electrodes 116, a first interlayer insulating film 118, contact holes 119, source bus lines 104 and a second interlayer insulating film 122 are formed on an insulative substrate 100 in the same manner as in the first example.

Then, according to the second example of the present invention, contact holes 124 and 125 are provided as shown in FIG. 3. Then, picture element electrodes 126, light shielding layer electrodes 127 and a light shielding frame section electrode 140 are formed. The light shielding layer electrodes 127 are used for forming light shielding layers 134 and the light shielding frame section electrode 140 is used for forming a light shielding frame section shielding layer 150 of a light shielding frame section 110.

Thereafter, a voltage is applied to all of the source bus lines 104 so as to form the light shielding layers 134 by an electrodeposition method by using the electrodes 127. In the case where a source bus line 104 has discontinuity, the light shielding layers 134 are not formed on the light shielding layer electrodes 127 connected to the source bus line 104 having the discontinuity. Using this fact, effectiveness of the source bus lines 104 can be checked by checking the light shielding layers 134. Accordingly, the discontinuity can be repaired by forming a compensation line. According to the second example of the present invention, simultaneously with the light shielding layer 134, the light shielding frame section shielding layer 150 is formed on the light shielding frame section electrode 140 by applying a voltage to the light shielding frame section electrode 140, thereby forming a light shielding frame section 110. Since the light shielding frame section 110 can be formed simultaneously with the light shielding layers 134, an extra step for forming the light shielding frame section 110 is not required.

Accordingly, the step of forming the light shielding layers 134 and the step of forming the light shielding frame section 110 can be simplified by employing electrochemical reaction.

Then, RGB color filters 128, 130 and 132 are sequentially formed by using the picture element electrodes 126 in the same manner as in the first example of the present invention.

According to the second example of the present invention, as in the first example of the present invention, the color filters, the light shielding layers and the light shielding frame section are formed on the TFT substrate. Therefore, a counter substrate can be easily produced by simply forming counter electrodes and an alignment film. Moreover, since the color filters are formed on the TFT substrate, the TFT substrate and the counter substrate can be adhered to each other without requiring high accuracy, and thus a large scale apparatus is not necessary, thereby simplifying the step of adhering the substrates.

EXAMPLE 3

Figure 4:
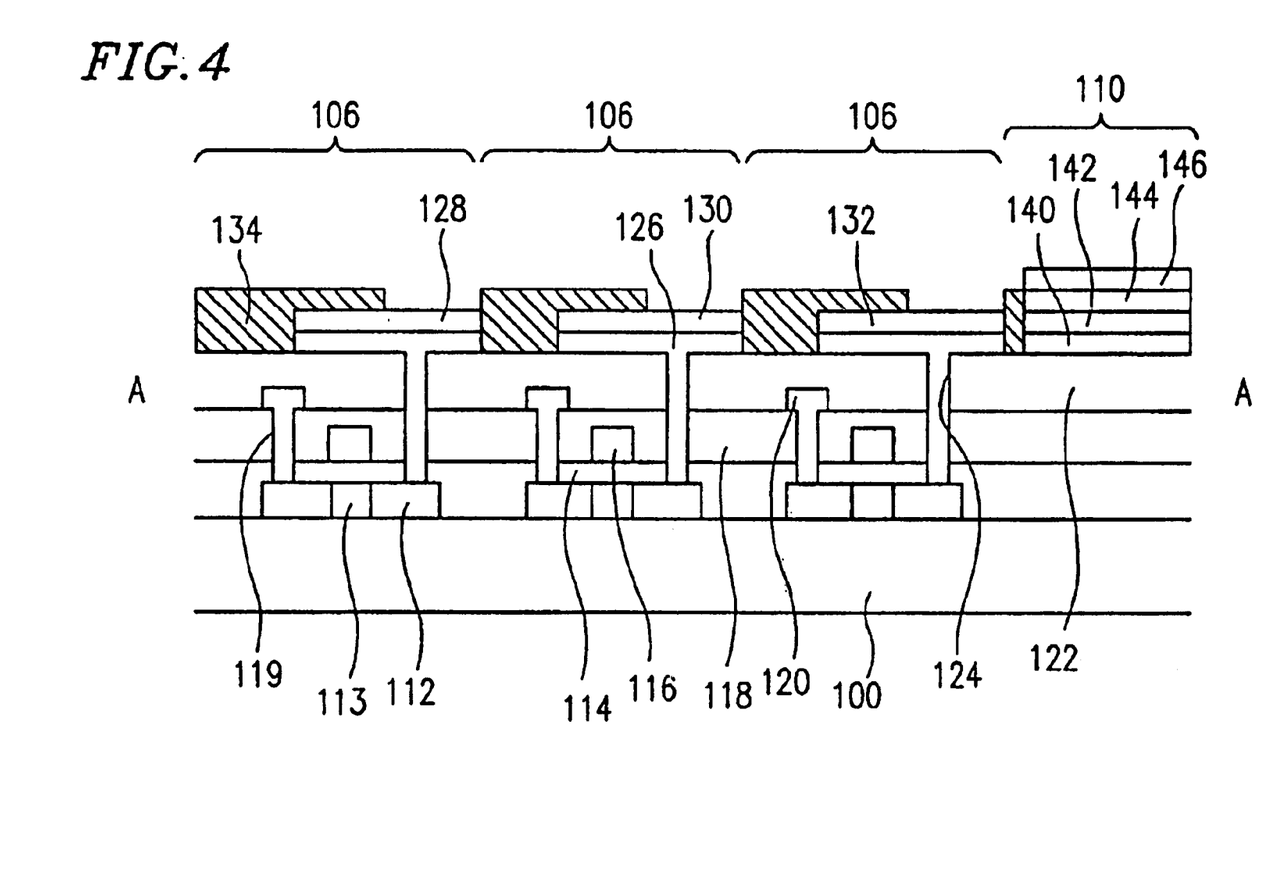
FIG. 4 is a cross-sectional view taken along line A—A of FIG. 1, showing three picture elements and a part of a light shielding frame section of the liquid crystal display device according to the third example of the present invention.

FIG. 4 is a cross-sectional view taken along line A—A of FIG. 1, showing three picture elements 106 and a part of the light shielding frame section 110 of a liquid crystal display device according to the a third example of the present invention.

Hereinafter, a method for producing the liquid crystal display device according to the third example of the present invention will be described with reference to FIG. 4.

Active layers 112 with undoped channel regions 113, gate insulating films 114, gate electrodes 116, a first interlayer insulating film 118, contact holes 119, source bus lines 104, a second interlayer insulating film 122 and contact holes 124 are formed on an insulative substrate 100 in the same manner as in the first example.

According to the third example of the present invention, picture element electrodes 126 and a light shielding frame section electrode 140 for a light shielding frame section 110 are formed simultaneously.

Then, RGB color filters 128, 130 and 132 are sequentially formed by using the picture element electrodes 126 in the same manner as in the first example of the present invention. According to the third example of the present invention, while sequentially forming the above-described RGB color filters 128, 130 and 132, an R colored layer 142, a G colored layer 144 and a B colored layer 146 which are made of the same materials as the RGB color filters 128, 130 and 132 are sequentially superimposed on the light shielding frame section electrode 140 by applying a voltage to the light shielding frame section electrode 140 during each of the steps of forming the RGB color filters 128, 130 and 132.

The thus-superimposed RGB colored layers 142, 144 and 146 sequentially superimposed on the light shielding frame section electrode 140 form a black layer, and act as a light shielding frame section 110.

Thereafter, light shielding layers 134 made of a black resist are formed, for shielding light incident to the TFTs and light leaking from gaps between each picture element electrodes.

According to the present invention, the color filters 128, 130 and 132 and the colored layers 142, 144 and 146 may be made of different materials and/or formed in different steps.

According to the third example of the present invention, as in the first example of the present invention, the color filters, the light shielding layers and the light shielding frame section are formed on the TFT substrate. Therefore, a counter substrate can be easily produced by simply forming counter electrodes and an alignment film. Moreover, since the color filters are formed on the TFT substrate, the TFT substrate and the counter substrate can be adhered to each other without requiring high accuracy, and thus a large scale apparatus is not necessary, thereby simplifying the step of adhering the substrates.

EXAMPLE 4

Figure 5:
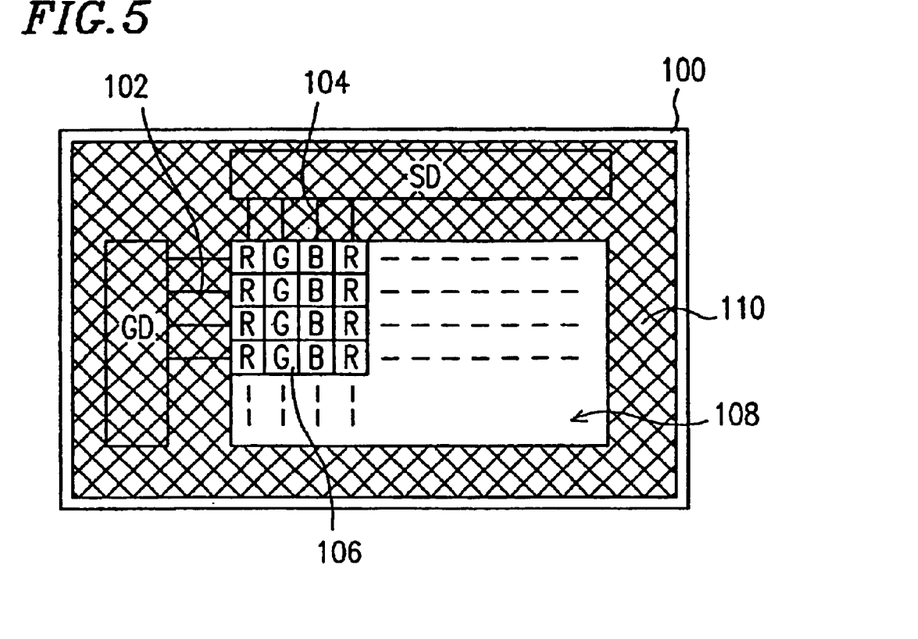
FIG. 5 is a plan view showing a TFT substrate of a liquid crystal display device according to a fourth example of the present invention.

FIG. 5 is a plan view showing a TFT substrate of a liquid crystal display device according to a fourth example of the present invention.

Referring to FIG. 5, a gate driver GD and a source driver SD are arranged on an insulative substrate 100 which is made of, for example, glass. Furthermore, the insulative substrate 100 has an image display region 108. The gate driver GD, the source driver SD and the TFT switching elements are formed on the same insulative substrate 100. The gate driver GD supplies scanning signals to picture elements 106 via gate bus lines 102. The source driver SD supplies data signals to the picture elements 106 via source bus lines 104.

According to the fourth example of the present invention, a light shielding frame section 110 is formed on the TFT substrate around a periphery of the image display region 108 and such that it covers the gate driver GD and the source driver SD as shown in FIG. 5 (indicated as a hatched portion).

According to the fourth example of the present invention, the light shielding frame section 110 is formed over the active elements and the driving circuits for driving the active elements, which are formed on the same substrate 100. Since the light shielding frame section 110 shields light incident to the driving circuits, the driving circuits are not affected by the incident light which induces the driving circuits to perform an error operation.

Furthermore, in the case where the light shielding frame section 110 is formed by an electrochemical reaction method by using the light shielding frame section electrode, as in the second and third examples, the driving circuits are also shielded by the light shielding frame section electrode, thereby preventing the driving circuits from generating unnecessary electric field.

According to another example of the present invention, light shielding layers and a light shielding frame layer may be formed on a TFT substrate while color filters are formed on a counter substrate. In this case, the color filters may be formed, for example, by dyeing, printing, or a color resist method. According to the color resist method, a color photosensitive resin is applied, exposed and developed, repeatedly. Furthermore, a lamination method is also known as a method for forming the color filters. According to the lamination method, color layers are formed by applying a colored photosensitive resin solution on a supporting body. Then, the thus-formed color layers are sequentially directly transferred on a transparent substrate, exposed and developed. The light shielding layers may be formed as described in the second and third example of the present invention.

According to this example, the light shielding layers and the light shielding frame section are formed on the TFT substrate. Therefore, a counter substrate can be easily produced by simply forming counter electrodes, color filters and an alignment film.

Herein, TFTs have been used as an example of switching elements, although the present invention is not limited thereto. The switching elements may be, for example, another type of device such as varistors and MIM elements.

According to an liquid crystal display device of the present invention, a TFT substrate includes a plurality of color filters on an area of the TFT substrate corresponding to a display region of the liquid crystal display device, and a light shielding frame layer around a periphery of the display region. Accordingly, there is no need for providing the color filters and the light shielding frame section on a counter substrate, and thus the counter substrate is easily produced. In addition, since the color filters are formed on the TFT substrate, the TFT substrate and the counter substrate are adhered to each other without requiring high accuracy, and thus a large scale apparatus is not necessary.

According to an liquid crystal display device of the present invention, the TFT substrate may further include light shielding layers formed on the switching elements for shielding light incident to the switching elements. In this case, there is no need for providing light shielding layers on the counter substrate. Thus, the step of forming the counter substrate is simple. On the other hand, in the case where the light shielding layers are formed on the counter substrate, the sizes of the light shielding layers need to be larger since a sealing margin of the TFT substrate and the counter substrate which is as small as, for example, about 3 μm, needs to be taken in account. Thus, an aperture ratio is decreased.

According to an liquid crystal display device of the present invention, the light shielding layers and the light shielding frame layer may be made of a same material. In this case, the light shielding layers and the light shielding frame section are formed in one step and thus the number of production steps is reduced.

According to an liquid crystal display device of the present invention, the light shielding layers and the light shielding frame layer may be formed through an electrochemical reaction. In this case, the light shielding layers are easily formed and effectiveness of TFTs in the image display region can be checked by visually checking the light shielding layers.

According to an liquid crystal display device of the present invention, the light shielding frame layer may be made from colored layers. In this case, the colored layers may be made of the same material as the color filters and may be formed simultaneously with the color filters. Thus, an additional step of forming the light shielding frame section is not required.

According to an liquid crystal display device of the present invention, the TFT substrate may further include a driving circuit for driving the switching elements, and the light shielding frame layer may be formed over the driving circuit. In this case, since light incident to the driving circuits is shielded by the light shielding frame section, the driving circuits are not affected by the incident light which induces the driving circuits to perform an error operation. Furthermore, the light shielding frame section may be formed by an electrochemical reaction method. In this case, the driving circuits are also shielded by the light shielding frame section electrode, thereby preventing the driving circuits from generating unnecessary electric field.

A method for producing a liquid crystal display device of the present invention includes a step of forming a plurality of color filters on an area of the TFT substrate corresponding to a display region of the liquid crystal display device, and a step of forming a light shielding frame layer on the TFT substrate around a periphery of the display region. Accordingly, there is no need for providing the color filters and the light shielding frame section on a counter substrate, and thus the counter substrate is easily produced. In addition, since the color filters are formed on the TFT substrate, the TFT substrate and the counter substrate are adhered to each other without requiring high accuracy, and thus a large scale apparatus is not necessary.

According to a method of producing a liquid crystal display device of the present invention, the step of forming the color filters and the step of forming the light shielding frame layer may be conducted as the same step. In this case, the light shielding frame section is formed simultaneously with the RGB color filters, and thus, an additional step of forming the light shielding frame section is not required.

According to a method of producing a liquid crystal display device of the present invention, the step of forming the light shielding layers and the step of forming the light shielding frame layer may be conducted as the same step. In this case, the light shielding layers and the light shielding frame section are formed in one step and thus the number of production steps is reduced.

According to a method of producing a liquid crystal display device of the present invention, the step of forming the light shielding layer may employ an electrochemical reaction. In this case, the light shielding layers are easily formed and effectiveness of TFTs in the image display region can be checked by visually checking the light shielding layers.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. An easy-to-manufacture color liquid crystal display device, said device comprising:

a first insulative substrate;

an insulative film layer with a substantially even upper surface on a surface of said first insulative substrate;

picture element electrodes aligned in a matrix configuration defining an image display region on said surface of said insulative film layer; and, a second insulative substrate on which a counter electrode is disposed;

wherein said first insulative substrate and said second insulative substrate are adhered to each other with a liquid crystal material interposed therebetween such that each said picture element electrode faces at least a portion of said counter electrode;

wherein said first insulative substrate further includes in a portion of said insulative film layer adjacent said surface of said insulative substrate a plurality of switching elements on said surface of said substrate and line means for supplying signals to said switching elements, said switching elements being connected respectively to said picture element electrodes through the remainder of said insulating film layer;

wherein a plurality of color filters are arranged to correspond respectively to selected ones of said picture element electrodes defining said display region, and, wherein on said surface of said insulative film layer a light shielding frame layer extends beyond the line defined by the inner surface of a sealant material providing an outer boundary around the circumference of the liquid crystal material.

2. A liquid crystal display device according to claim 1, wherein the light shielding layers and the light shielding frame layers are made of the same material.

3. A liquid crystal display device according to claim 1, wherein the light shielding layers and the light shielding frame layer are formed through an electrochemical reaction.

4. A liquid crystal display device according to claim 1, wherein said plurality of color filters includes color filters of three different kinds, one of said kinds being red, one of said kinds being green and one of said kinds being blue; and wherein said color filters are surrounded by said light shielding layers.

5. The liquid crystal display device according to claim 1, wherein said first insulative substrate further comprises a driving circuit for driving the switching elements, and the light shielding frame layer is formed over the driving circuit.

6. The liquid crystal display device according to claim 5, wherein said counter electrode includes at least two portions.

7. The liquid crystal display device according to claim 6, wherein said at least two portions are arranged in substantially mutually parallel relation with one another.

* * * * *